United States Patent [19]
McEntire

[11] 3,738,163
[45] June 12, 1973

[54] ANCHOR TESTER
[75] Inventor: Robert H. McEntire, Richardson, Tex.
[73] Assignee: Atlantic Richfield Company, New York, N.Y.
[22] Filed: Mar. 24, 1972
[21] Appl. No.: 237,729

[52] U.S. Cl. .................................. 73/95, 73/141 R
[51] Int. Cl. ............................................ G01n 3/10
[58] Field of Search.................... 73/141 R, 95, 97, 73/88 B, 88 E, 88 F

[56] References Cited
UNITED STATES PATENTS
3,543,569   12/1970   Carter................................ 73/95

Primary Examiner—Charles A. Ruehl
Attorney—Blucher S. Tharp, Roderick W. MacDonald and M. David Folzenlogen

[57] ABSTRACT

A device for testing anchors (dead men) embedded in the earth so that a force can be applied to the anchor at a known and desired angle, the device employing an inclined support surface which carries a piston and cylinder means. The piston and cylinder means can be moved and stopped at a plurality of points along the length of the support surface.

8 Claims, 4 Drawing Figures 3,738,163
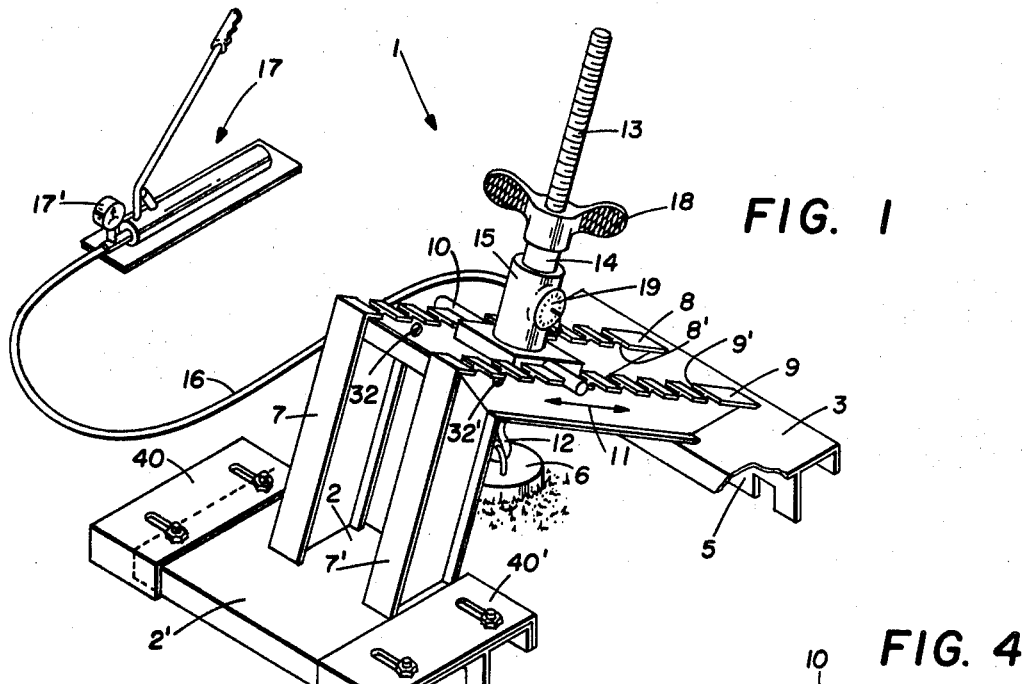
FIG. 1
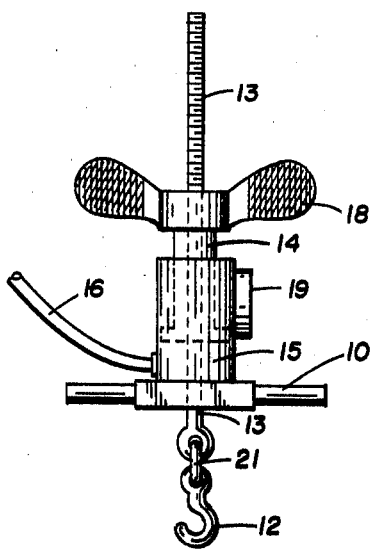
FIG. 3
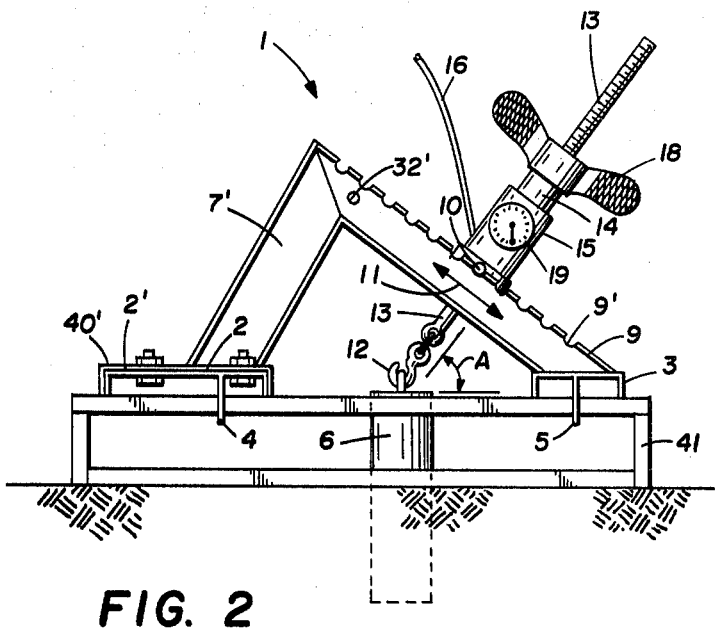
FIG. 4
FIG. 2

ANCHOR TESTER

BACKGROUND OF THE INVENTION

There are numerous anchors embedded in remote spots of the earth which, for safety reasons, should be tested periodically to see if the anchor has deteriorated to the point where it will no longer support the force for which it was initially designed.

This is particularly true in oil fields where wells are located at remote spots and have a plurality of anchors spaced therearound. These anchors are designed to carry a force acting at an angle between horizontal and vertical.

Thus, it is desirable to have a device for testing dead man anchors embedded in the earth by employing a substantial force at the designed angle for the particular anchor of interest, the device being portable so that it can be easily transported to remote locations for on-site testing.

SUMMARY OF THE INVENTION

According to this invention, there is provided a portable device which can test an anchor with a force at any angle from vertical to horizontal.

The device according to this invention employs an inclined support means which is placed over the anchor and which carries a piston and cylinder means, the piston and cylinder means being locatable at a number of points along the length of the support means, and means for actuating the piston and cylinder means to pull a connecting means away from the anchor at the desired angle of testing.

Accordingly, it is an object of this invention to provide a new and improved device for testing dead man anchors. It is another object to provide a new and improved device for employing a known force to an anchor at a desired angle relative to that anchor. It is another object to provide a new and improved device for testing an anchor which is adjustable so that the angle of the force applied to the anchor during testing is adjustable.

Other aspects, objects and advantages of this invention will be apparent to those skilled in the art from this disclosure and the appended claims.

DETAILED DESCRIPTION OF THE INVENTION

FIG. 1 shows apparatus embodying this invention.
FIG. 2 is a plan view of the apparatus of FIG. 1.
FIG. 3 is an elevation view of part of the apparatus of FIG. 1.
FIG. 4 shows apparatus according to one embodiment of this invention.

More specifically, FIG. 1 shows a frame means 1 which is composed of spaced apart feet 2 and 3 having claws 4 and 5, respectively, for penetrating into the earth and holding frame means 1 in position relative to anchor 6 which is embedded in the earth. One or both of claws 4 and 5 can be omitted or other forms such as spikes can be used as claws. Frame means 1 also carries upstanding spaced apart legs 7 and 70'. A support means extends between the upper ends of legs 7 and 7' and foot 3 which, in the embodiment of FIG. 1, is shown to be composed of spaced apart members 8 and 9. Members 8 and 9 are upwardly inclined relative to the surface of the earth and extend upwardly from the surface of the earth.

Members 8 and 9 have a plurality of matching notches 8' and 9' on each so that an elongate means or a cross member 10 which is placed transverse to the long axis 11 of support means 8 and 9 extends at least in part across the upper surfaces of support means 8 and 9 and fits into matching notches 8' and 9'. Notches 8' and 9' can be cut in the member 8 or 9 as shown or members 8 and 9 can each carry a gear rack, the rack teeth serving to define the grooves 8' and 9'. Any means for employing matched grooves on members 8 and 9 can be used. The matched grooves help support the piston, cylinder, etc., while setting up the device for testing, after commencement of the test, simple friction can hold member 10 in place. In this way, cross member 10 can be placed at a plurality of points along the length of support means 8 and 9 thereby adjusting the angle A (see FIG. 2) at which hook 12 and its connecting means 13 apply a force to test anchor 6. Hook 12 could be a clevis or other holding means as desired. Member 10 can fit into the notches themselves as shown or can carry a means for meshing with notches 8' and 9'. For example, when supports 8 and 9 carry gear racks to provide notches 8' and 9', member 10 can carry gear racks to mesh with the racks carried by members 8 and 9. FIG. 4 shows support 9 with a gear rack 30 welded along the outer side thereof to provide notches 9', member 10 having a portion of a rack 31 welded thereto so that the teeth of 30 and 31 can mesh to hold member 10 in place. Similar structure would be used for member 8. Member 10 rotates in rack portion 31 so that the teeth of both racks can mesh even though the piston and cylinder and member 10 change in their angular relationship with respect to support 9. Member 10 rests on and is supported primarily by support 9 and not rack 30. The same applies to support 8 and its racks. The feature of member 10 rotating in rack portion 31 allows the force on member 31 to be kept essentially parallel to member 9 and allows tilting of member 13 with a subsequent change in angle A as the device is operated to set the claws in the earth without exerting forces on member 31 which are essentially perpendicular to support 9.

Member 10 carries a piston and cylinder means composed of piston 14 and cylinder 15. For example, member 10 can have a housing into which cylinder 15 slides and in which cylinder 15 is removably fixed by means of one or more locking screws carried by the housing. Cylinder 15 is connected by way of conduit 16 to a means 17 for actuating piston and cylinder means 14 and 15. Connecting means 13 carries a wing nut means 18 which threadably engages the upper end of connecting means 13 as shown. Compression means 17 can be a hydraulic means or any other type of means for actuating piston and cylinder means 14 and 15.

Cylinder 15 carries an angle indicator means 19 for indicating the angle of connecting means 13 with respect to the earth's surface upon which frame means 1 directly or indirectly rests and in which an anchor is embedded. Means 19 can be simply a plumb line and an angle indicator such as a protractor or any other conventional angle indicating device known. Means 19 can be removably attached to any part of the device by way of a magnet.

Foot 2 can have an enlarged area 2' on which to carry unit 17 when the device is in transit. Apertures 32 are provided for a two-pronged transporting hook to be placed in support means 8 and 9. Apertures 32 are preferably in line with the center of gravity of the device when unit 17 is mounted on foot 2 for transportation of the device to its situs of use.

FIG. 2 shows the device of FIG. 1 and the angle A at which connecting means 13 is connected to anchor 6. Generally, the length of support means 8 and 9 can be adjusted so that testing angle A can vary from zero to 90° or any shorter range of angles as desired.

Compressor means 17 carries a pressure gauge 17' which can be calibrated to indicate the force applied to anchor 6 during testing so that both the force applied during the test and the angle A of the test can be directly read from the apparatus of FIG. 1.

FIG. 3 shows hook 12 to be connected to connecting means 13 by conventional linkage 21.

FIG. 3 further shows that connecting means 13 extends through the interior of piston 14.

Thus, in operation, after the device is connected to anchor 6 as shown in FIGS. 1 and 2 and piston means 14 is actuated by way of compressor means 17, piston 14 will move outwardly of cylinder means 15 and away from anchor 6 and support means 8 and 9. Since piston 14 is in contact with nut means 18, it will force connecting means 13 in the same direction thereby applying a force to anchor 6 at angle A. For example, a load of 11.5 tons, as registered by gauge 17', is applied at an angle A of 65°, both magnitudes being directly readable from elements 17' and 19 on the device. The device as shown in FIG. 1 weighs approximately 200 pounds so it is readily transportable by a pickup truck.

The cross sectional area of feet 2 and 3 should be adjusted in relation to the load limit of the earth's surface in which anchor 6 is embedded. Depending upon length of legs 7 and 7' and support means 8 and 9, the frame can test anchors whose upper surface is elevated above the ground. The notched surfaces of support means 8 and 9 allow easy manipulation of cross member 10 for adjustment of the angle of pull while still allowing the piston and cylinder means to be fixed at an angle A without slippage along support means 8 and 9.

In setting up the device, it is preferable to set frame 1 over anchor 6 with the notched surfaces of support means 8 and 9 pointing toward the desired direction of pull after which hook 12 is engaged with anchor 6 and nut 18 adjusted to hold piston 14 in place at the approximate desired pull angle A. A particular advantage of wing nut 18 and rod 13 is that since piston 14 normally is limited to a small distance through which it can move, wing nut 18 can be moved along rod 13 to take up slack in the connection to anchor 6 that piston 14 could not. Cylinder 15 is then pressured by compressor 17 to set claws 4 and 5 into the earth up to the support surfaces of feet 2 and 3 without overpulling the anchor at this time. Angle A is then checked and adjusted if necessary by moving member 10 to another set of matched notches after which the desired load is applied to the anchor for the desired time of testing.

This invention can be used to test anchors located anywhere onshore or offshore so long as a man or diver can get to the anchor.

To make the device more easily transportable from anchor to anchor, wheels can be provided on either or both of feet 2 and 3 or any other place desired on the frame means or support means. The wheels are preferably detachable, retractable, or can be swung away so that the feet of the device can be set squarely on the ground.

Feet 2 and 3 can be provided with telescoping or other lateral extensions 40 in FIG. 1 to provide greater bearing surface for the device. Additionally, vertical extensions can be used to elevate the device over a tall anchor. For example, a frame 41, FIG. 2, to which the device is removably bolted can be used as a vertical extender. The extensions can be detachable.

Reasonable variations and modifications are possible within the scope of this disclosure without departing from the spirit and scope of this invention.

I claim:

1. A device for testing an anchor embedded in the earth comprising a frame means to set over said anchor, said frame means having an elongate support means which extends at an angle upwardly from the surface of the earth, a piston and cylinder means carried on said support means, said piston and cylinder means being movable along the length of said support means so that said piston and cylinder means can be fixed at any one of a plurality of points along the length of said support means, connecting means carried by said piston and cylinder means for connecting one end thereof to said anchor, means for actuating said piston and cylinder means to pull said one end of said connecting means away from said anchor, said support means comprises a pair of spaced apart members having a plurality of matching notches at spaced apart points along the length thereof, said notches being in the upper surface of said members relative to said earth's surface, said cylinder of said piston and cylinder means is carried by an elongate means which extends transverse to the long axis of said support means and across at least part of both said members, said elongate means having means for meshing with said matching notches, and said connecting means is carried by the piston of said piston means, said piston being carried by said cylinder means so that actuation thereof moves said piston away from an anchor under said frame means.

2. A device according to claim 1 wherein said connecting means is a rod having a hook at the anchor end and extending through said piston and said cylinder so that the opposite end of said rod extends above said piston, said opposite end of said rod eing threaded and carrying a nut means, said nut means being in contact with said piston so that movement of said piston forces said rod in the same direction as said piston.

3. A device according to claim 1 wherein said spaced apart members each carry a gear rack to provide said matching notches, and said elongate means rotatably carries a portion of gear rack at either end of said elongate means, said portions of gear rack meshing with said gear racks carried by said spaced apart members.

4. A device according to claim 1 wherein said means for actuating said piston and cylinder means is hydraulic compressor means.

5. A device according to claim 1 wherein said piston and cylinder means carries removable means for indicating the angle of said connecting means with respect to said surface of the earth.

6. A device according to claim 1 wherein said frame means has claws for penetrating into the earth to hold said frame means in position relative to said anchor.

7. A device according to claim 1 wherein said frame means has space on which to carry said compression means when said device is in transit.

8. A device according to claim 1 wherein said connecting means employs a rod that extends through said piston and said cylinder so that the end of said rod opposite its anchor end extends above said piston, said opposite end of said rod being threaded and carrying a nut means, said nut means being in contact with said piston so that movement of said piston forces said rod in the same direction as said piston.

* * * * *